US009447219B2

(12) United States Patent
Bouquet et al.

(10) Patent No.: US 9,447,219 B2
(45) Date of Patent: Sep. 20, 2016

(54) IMPACT MODIFIED MONOVINYLIDENE AROMATIC POLYMER HAVING LOW RUBBER CROSSLINKING (75) Inventors: Gilbert C. E. Bouquet, Ghent (BE); Fredericus Slijkerman, Terneuzen (NL)

(73) Assignee: Styron Europe GMBH, Horgen (CH)

( * ) Notice: Subject to any disclaimer, the term of this patent is extended or adjusted under 35 U.S.C. 154(b) by 808 days.

(21) Appl. No.: 13/500,135

(22) PCT Filed: Oct. 6, 2010

(86) PCT No.: PCT/EP2010/006112
§ 371 (c)(1),
(2), (4) Date: Apr. 4, 2012

(87) PCT Pub. No.: WO2011/042178
PCT Pub. Date: Apr. 14, 2011

(65) Prior Publication Data
US 2012/0202949 A1    Aug. 9, 2012

(30) Foreign Application Priority Data

Oct. 7, 2009  (EP) .................................... 09172468

(51) Int. Cl.
C08F 257/02 (2006.01)
C08F 279/02 (2006.01)
C08L 51/04 (2006.01)
(Continued)

(52) U.S. Cl.
CPC ........... *C08F 279/02* (2013.01); *C08F 257/02* (2013.01); *C08F 279/04* (2013.01); *C08L 51/003* (2013.01); *C08L 51/04* (2013.01); *C08L 55/02* (2013.01)

(58) Field of Classification Search
CPC .. C08F 257/02; C08F 279/02; C08F 279/04; C08L 51/003; C08L 51/04; C08L 55/02
USPC ......................................... 525/233, 232, 315
See application file for complete search history.

(56) References Cited

U.S. PATENT DOCUMENTS 4,144,204 A   3/1979  Mittnacht et al.
5,286,792 A   2/1994  Wu et al.
(Continued)

FOREIGN PATENT DOCUMENTS

CN    1083463 C    4/2002
CN    1556818 A    12/2004
(Continued)

OTHER PUBLICATIONS

Notice of Reasons for Rejection (English translation) for corresponding Japanese Application No. 2012-532488, dated Feb. 18, 2014 (10 pages).
(Continued)

*Primary Examiner* — Mark Kaucher
(74) *Attorney, Agent, or Firm* — Brinks Gilson & Lione; Ryan L. Marshall (57) ABSTRACT

The ductility/stiffness balance of a rubber-modified monovinylidene aromatic polymer, e.g., HIPS, is increased without increasing the rubber content of the polymer and/or changing the size of the average rubber particle by a process comprising the step of crosslinking the rubber such that the rubber-modified polymer has an optical crosslink index (OCLI) of <0.5 and an injection molded/compression molded (IM/CM) modulus ratio ≥1.3.

21 Claims, 3 Drawing Sheets (51) Int. Cl.
*C08L 55/02* (2006.01)
*C08F 279/04* (2006.01)
*C08L 51/00* (2006.01)

(56) References Cited

U.S. PATENT DOCUMENTS

| | | | |
|---|---|---|---|
| 5,576,385 | A | 11/1996 | Tiefensee et al. |
| 5,633,318 | A * | 5/1997 | Bowen .................. 525/71 |
| 6,187,862 | B1 | 2/2001 | Chang et al. |
| 6,380,304 | B1 | 4/2002 | Vanspeybroeck et al. |
| 6,784,253 | B2 | 8/2004 | Vilasagar et al. |
| 2002/0077425 | A1 | 6/2002 | Kawano et al. |
| 2002/0156183 | A1 | 10/2002 | Nagata et al. |
| 2006/0089434 | A1* | 4/2006 | Nodera .................. 524/115 |
| 2006/0135692 | A1 | 6/2006 | Shibata et al. |
| 2007/0066708 | A1 | 3/2007 | Goldacker et al. |
| 2007/0106028 | A1* | 5/2007 | Maes et al. .................. 525/240 |
| 2008/0207830 | A1 | 8/2008 | Weber et al. |

FOREIGN PATENT DOCUMENTS

| | | |
|---|---|---|
| CN | 1727375 A | 2/2006 |
| JP | H07-053642 | 2/1995 |
| JP | H07-149846 | 6/1995 |
| JP | 2002-275210 | 9/2002 |
| JP | 2003-511495 A | 3/2003 |
| JP | 2005-232422 A | 9/2005 |
| JP | 2009-7590 A | 1/2009 |
| WO | WO 01/25303 A1 | 4/2001 |
| WO | WO 03/010214 A1 | 2/2003 |
| WO | WO 2011/042178 A1 | 4/2011 |

OTHER PUBLICATIONS

Notification of the First Office Action (English translation) for corresponding Chinese Application No. 201080044865.8, dated Jun. 5, 2013 (18 pages).

Notification of Reexamination (English translation) for corresponding Chinese Application No. 201080044865.8, dated Sep. 9, 2014 (21 pages).

Office Action and Search Report (English translations) for corresponding Taiwan Application No. 99134004, dated Oct. 20, 2014 (11 pages).

Notice of Reasons for Rejection (English translation) for corresponding Japanese Application No. 2012-532488, dated Jan. 13, 2015 (6 pages).

* cited by examiner

IMPACT MODIFIED MONOVINYLIDENE AROMATIC POLYMER HAVING LOW RUBBER CROSSLINKING

CROSS-REFERENCE TO RELATED APPLICATIONS

None

STATEMENT REGARDING FEDERALLY SPONSORED RESEARCH OR DEVELOPMENT

None

FIELD OF THE INVENTION

This invention relates to compositions comprising monovinylidene aromatic polymers.

BACKGROUND OF THE INVENTION

Impact-modified polymers, e.g., polymers admixed or copolymerized with a rubber, have a balance between ductility (impact resistance) and stiffness (modulus). The known method to improve ductility is to increase the rubber content of the modified polymer. However, the higher the rubber content in the bulk polymer, the less stiff the polymer. In applications in which a certain level of stiffness is required, an increase of rubber content can require an increase in wall thickness (to maintain a certain level of deflection under load). This, in turn, means more material to produce the article and this, in turn, means more cost to produce the article.

One alternative method of optimizing the ductility/stiffness balance of a rubber-modified polymer is to decrease the average size of the rubber particles. However, this is not desirable for certain applications, e.g., for rubber-modified polymers intended for use in high environmental stress crack resistance (ESCR) applications where large rubber particles are required.

Of interest to the manufacturers of rubber-modified monovinylidene aromatic polymers, is a rubber-modified polymer in which the ductility/stiffness balance is improved (see FIG. 3) without increasing the amount of rubber in the polymer and/or decreasing the average size of the rubber particle.

SUMMARY OF THE INVENTION

In one embodiment the invention is a process of modifying the ductility/stiffness balance of a rubber-modified monovinylidene aromatic polymer, the process comprising the step of crosslinking the rubber such that the rubber-modified polymer has an optical crosslink index (OCLI) of less than (<) 0.5. In one embodiment the process of this invention does not increase the amount of rubber in the rubber-modified monovinylidene aromatic polymer. In one embodiment the process of this invention does not change the particle size of the rubber in the rubber-modified monovinylidene aromatic polymer.

In one embodiment the invention is a rubber-modified monovinylidene polymer in which the rubber is crosslinked such that the modified polymer has an OCLI of <0.5 and an injection molded to compression molded (IM/CM) modulus ratio equal to or greater than (≥) 1.3.

In one embodiment the invention is an article made from a rubber-modified monovinylidene polymer in which the rubber is crosslinked such that the modified polymer has an OCLI of <0.5 and a modulus ratio ≥1.3. The article can be made by any suitable process, e.g., extrusion, injection molding, calendering, roto-molding, slush molding, blow molding, thermoforming and compression molding.

DESCRIPTION OF THE PREFERRED EMBODIMENT

Unless stated to the contrary, implicit from the context, or customary in the art, all parts and percents are based on weight and all test methods are current as of the filing date of this disclosure. For purposes of United States patent practice, the contents of any referenced patent, patent application or publication are incorporated by reference in their entirety (or its equivalent US version is so incorporated by reference) especially with respect to the disclosure of synthetic techniques, definitions (to the extent not inconsistent with any definitions specifically provided in this disclosure), and general knowledge in the art.

The numerical ranges in this disclosure are approximate, and thus may include values outside of the range unless otherwise indicated. Numerical ranges include all values from and including the lower and the upper values, in increments of one unit, provided that there is a separation of at least two units between any lower value and any higher value. As an example, if a compositional, physical or other property, such as, for example, molecular weight, viscosity, melt index, etc., is from 100 to 1,000, it is intended that all individual values, such as 100, 101, 102, etc., and sub ranges, such as 100 to 144, 155 to 170, 197 to 200, etc., are expressly enumerated. For ranges containing values which are less than one or containing fractional numbers greater than one (e.g., 1.1, 1.5, etc.), one unit is considered to be 0.0001, 0.001, 0.01 or 0.1, as appropriate. For ranges containing single digit numbers less than ten (e.g., 1 to 5), one unit is typically considered to be 0.1. These are only examples of what is specifically intended, and all possible combinations of numerical values between the lowest value and the highest value enumerated, are to be considered to be expressly stated in this disclosure. Numerical ranges are provided within this disclosure for, among other things, the component amounts of the rubber-modified polymer and the OCLI and IM/CM values.

Monovinylidene Aromatic Polymers

Monovinylidene aromatic homopolymers and copolymers (individually and collectively referred to as "polymers" or "copolymers") are produced by polymerizing monovinylidene aromatic monomers such as those described in U.S. Pat. Nos. 4,666,987, 4,572,819 and 4,585,825. The monovinylidene aromatic monomers suitable for producing the polymers and copolymers used in the practice of this invention are preferably of the following formula:

in which R' is hydrogen or methyl, Ar is an aromatic ring structure having from 1 to 3 aromatic rings with or without alkyl, halo, or haloalkyl substitution, wherein any alkyl group contains 1 to 6 carbon atoms and haloalkyl refers to a halo substituted alkyl group. Preferably, Ar is phenyl or alkylphenyl (in which the alkyl group of the phenyl ring contains 1 to 10, preferably 1 to 8 and more preferably 1 to 4, carbon atoms), with phenyl being most preferred. Typical monovinylidene aromatic monomers which can be used include: styrene, alpha-methylstyrene, all isomers of vinyl toluene, especially para-vinyl toluene, all isomers of ethyl styrene, propyl styrene, vinyl biphenyl, vinyl naphthalene, vinyl anthracene and the like, and mixtures thereof with styrene being the most preferred.

The monovinylidene aromatic monomer can be copolymerized with one or more of a range of other copolymerizable monomers. Preferred comonomers include nitrile monomers such as acrylonitrile, methacrylonitrile and fumaronitrile; (meth)acrylate monomers such as methyl methacrylate or n-butyl acrylate; maleic anhydride and/or N-aryl maleimides such as N-phenyl maleimide, and conjugated and nonconjugated dienes. Representative copolymers include styrene-acrylonitrile (SAN) copolymers. The copolymers typically contain at least about 1, preferably at least about 2 and more preferably at least about 5, wt % of units derived from the comonoiner based on weight of the copolymer. Typically, the maximum amount of units derived from the comonomer is about 40, preferably about 35 and more preferably about 30, wt % based on the weight of the copolymer.

The weight average molecular weight (Mw) of the monovinylidene aromatic polymers used in the practice of this invention can vary widely. For reasons of mechanical strength, among others, typically the Mw is at least about 100, preferably at least about 120 more preferably at least about 130 and most preferably at least about 140 kg/mol. For reasons of processability, among others, typically the Mw is less than or equal to about 400, preferably less than or equal to about 350, more preferably less than or equal to about 300 and most preferably less than or equal to about 250 kg/mol.

Similar to the Mw, the number average molecular weight (Mn) of the monovinylidene aromatic polymers used in the practice of this invention can also vary widely. Again for reasons of mechanical strength, among others, typically the Mn is at least about 30, preferably at least about 40, more preferably at least about 50 and most preferably at least about 60 kg/mol. Also for reasons of processability, among others, typically the Mn is less than or equal to about 130, preferably less than or equal to about 120 more preferably less than or equal to about 110 and most preferably less than or equal to about 100 kg/mol.

Along with the Mw and Mn values, the ratio of Mw/Mn, also known as polydispersity or molecular weight distribution, can vary widely. Typically, this ratio is at least about 2, and preferably greater than or equal to about 2.3. The ratio typically is less than or equal to about 4, and preferably less than or equal to about 3. The Mw and Mn are typically determined by gel permeation chromatography using polystyrene standards for calibration.

Rubbers

The rubber can be any rubbery polymer having a glass transition temperature (Tg) of not higher than about 0° C., preferably not higher than about −20° C., as determined according to ASTM D-756-52T. Tg can be determined by differential scanning calorimetry (DSC).

The rubbers suitable for use in the present invention are those that have a solution viscosity in the range of about 5 to about 300 cPs (5 percent by weight in styrene, at 20° C.) and Mooney viscosity of about 5 to about 100 (ML 1+4, 100° C.). Suitable rubbers include, but are not limited to, diene rubbers, diene block rubbers, butyl rubbers, ethylene-propylene (EP) rubbers, ethylene-propylene-diene monomer (EPDM) rubbers, ethylene copolymer rubbers, acrylate rubbers, halogen-containing rubbers, silicone rubbers and mixtures of two or more of these rubbers. Also suitable are interpolymers of rubber-forming monomers with other copolymerizable monomers. Suitable diene rubbers include, but are not limited to, conjugated 1,3-dienes, for example, butadiene, isoprene, piperylene, chloroprene, or mixtures of two or more of these dienes. Suitable rubbers also include homopolymers of conjugated 1,3-dienes and interpolymers of conjugated 1,3-dienes with one or more copolymerizable monoethylenically unsaturated monomers, for example, copolymers of isobutylene and isoprene.

Preferred rubbers are diene rubbers such as polybutadiene, polyisoprene, polypiperylene, polychloroprene, and the like or mixtures of diene rubbers, i.e., any rubbery polymers of one or more conjugated 1,3-dienes, with 1,3-butadiene being especially preferred. Such rubbers include homopolymers and copolymers of 1,3-butadiene with one or more copolymerizable monomers, such as monovinylidene aromatic monomers as described above, styrene being preferred. Preferred copolymers of 1,3-butadiene are block or tapered block rubbers of at least about 30, more preferably at least about 50, even more preferably at least about 70, and still more preferably at least about 90, wt % 1,3-butadiene rubber, and preferably up to about 70, more preferably up to about 50, even more preferably up to about 30, and still more preferably up to about 10, wt % monovinylidene aromatic monomer, all weights based on the weight of the 1,3-butadiene copolymer.

The rubber in the rubber-modified polymers of this invention is typically present in an amount equal to or less than about 40, preferably equal to or less than about 25, more preferably equal to or less than about 20, even more preferably equal to or less than about 15, and most preferably equal to or less than about 10 wt % based on the weight of the rubber-modified polymer. Typically, HIPS products contain less rubber than ABS products.

Crosslinking of the Rubber

The method by which the rubber in the final product is crosslinked is not critical to this invention as long as the rubber is crosslinked below a maximum level, i.e., to an OCLI of <0.5. In one embodiment minimal crosslinking is achieved by controlling the temperature in the finishing section of the process train, e.g., the devolatization or "devo" section of the train in which solvent and unreacted monomer are removed from the product. In one embodiment minimal crosslinking is achieved by controlling the residence time of the product in the finishing section of the process train. In one embodiment minimal crosslinking is achieved by controlling the structure (e.g., microstructure, molecular weight and unsaturation) of the rubber so as to make it less sensitive to crosslinking reactions. In one embodiment minimal crosslinking is achieved by diluting the product with one or more oils that exhibit a preference for the rubber phase. In one embodiment two or more of these methods are used in combination with one another.

The actual temperature and/or residence time for minimal crosslinking is, of course, at least partially dependent upon the hardware (equipment) and raw materials of the process. Typically one or both of the temperature and residence time of the devo operation are reduced from that at which it operates to make product in which minimal crosslinking is not an objective. For example, in the commercial process to make conventional HIPS, i.e., HIPS without minimal crosslinking, and in which the rubber is a polydiene rubber, typically only one devolatization unit is employed and it is typically operated at a temperature in the range of 245-260° C. The residence time of the HIPS product in the unit is typically in the range of 10-40 minutes. To make the same HIPS but with an OCLI of <0.5 and using the same equipment, one or both of the devo temperature and the residence time of the product in the devo unit are reduced, e.g., reducing the devo operating temperature to 235-245° C. and/or the residence time of the product in the devo to 2-10 minutes.

As another example, in the commercial process to make conventional ABS, i.e., ABS without minimal crosslinking, typically two devo units are operated in series. The first unit is typically operated at a lower temperature than that of the second devo unit, e.g., the first unit in the range of 180-200° C., and the second unit in the range of 245-260° C. The residence time of the ABS product in the first devo unit is typically 10-40 minutes, and the residence time of the ABS product in the second devo unit is the same. To make the same ABS product but with an OCLI of <0.5 and using the same equipment, the operating temperature and/or the residence time of the ABS product in one or both of the devo units is reduced. Typically the devo unit operating at the severest conditions, e.g., highest temperature and/or longest residence time, is the second of the two units, and it is within this unit where most of the crosslinking occurs. This second unit operates at a reduced temperature and/or residence time, e.g., to 235-245° C. and/or 2-10 minutes.

In the embodiment in which crosslinking is minimized to an OCLI of <0.5 by controlling the structure of the rubber, the number and types of crosslinking sites in the rubber are managed, e.g., minimized. Standard polybutadiene rubber contains many double bonds all of which are potential sites for crosslinking reactions. Polybutadiene contains three types of double bonds: cis, trans and 1,2-vinyl. The most reactive configuration is 1,2-vinyl. By selecting polybutadienes with little, if any, 1,2-vinyl content, i.e., controlling the microstructure of the molecule, the ability or inclination of the molecule to crosslink is reduced. As such, the process of this invention favors the use of high cis polybutadiene (as compared to low cis polybutadiene) because high cis rubber has a very low amount of 1,2-vinyl groups.

Another possibility is to reduce the number of double bonds in the polymer chain by, for example, partial hydrogenation or by the introduction of comonomers that after copolymerization give a saturated unit. Typical examples are ethylene (E) and propylene (P) as used to manufacture EP rubber and ethylene-propylene-diene monomer (EPDM) rubber.

If controlling the rubber structure is not an option, then dilution of the rubber with inert oil can reduce the crosslinking kinetics (as compared to a similar process in which the rubber is not diluted with inert oil). The most efficient oils are those that selectively dissolve in the rubber phase as opposed to the matrix, e.g., poly-α-olefin oils.

Because the objective of the invention is minimal crosslinking of the rubber component of the product, crosslinking initiators, e.g., peroxide, and crosslinking assists are not employed. Initiators introduced to the process at the beginning, e.g., peroxide, to initiate the polymerization reaction of the monovinylidene aromatic monomer, are typically consumed by the time the polymerization product reaches the finishing phase, e.g., the devolatilization units.

Degree of Crosslinking

The rubber-modified polymers of this invention are crosslinked only to a limited extent. One measure of the degree of crosslinking is the optical crosslink index (OCLI). For purposes of this invention, this index is determined using a Brinkmann Model PC 800 probe colorimeter equipped with a 450 nm wavelength filter available from Brinkmann Instruments Inc. The procedure for using the instrument is as follows: In a first vial a 0.4 gram (g) sample of rubber-modified polymer is dissolved in 40 milliliters (mL) of dimethyl formamide (DMF). From the first vial 5 mL of the resulting DMF solution is added to a second vial containing 40 mL of DMF. From the first vial 5 mL of the resulting DMF solution is added to a third vial containing 20 mL of dichloromethane (DCM). The probe is zeroed in neat DMF. The absorption of the DMF solution in the second vial and the absorption of the DCM in the third vial are determined. The light absorbance ratio is calculated by the following equation:

$$OCLI=(absorbance\ of\ sample\ in\ DCM)/(absorbance\ of\ sample\ in\ DMF).$$

The crosslinked rubber-modified polymers of this invention have an OCLI of less than (<) 0.5, preferably <0.45 and more preferably <0.4.

Tensile Modulus Ratio

The crosslinked, rubber-modified polymers of this invention have an IM/CM modulus ratio of, prior to the addition of any fillers, equal to or greater than (≥) 1.3, preferably ≥1.32 more preferably ≥35.

IM is the tensile modulus for injection molded samples as determined in accordance with ASTM D-638 (test specimen type 1) using a test speed of 1 mm/min (HIPS) and is reported in MegaPascal (MPa). Test specimens are prepared using a Toyo 2 injection molding apparatus and an ASTM T-bar mold. The apparatus temperature (rear, center rear, center, center-front, front and nozzle) is 221° C. (430° F.), and the screw size is 32 millimeters (mm) operated at 60 revolutions per minute (rpm) to build a backpressure of 0.7 MPa. The shot size is 25 cubic centimeters (cc), decompression is 0.5 cc, and recovery time is 10.6 seconds. The mold temperature (both movable and stationary) is 46° C. (115° F.). The mold is filled at an injection pressure of 103 MPa at a velocity of 15 cc per second (cc/s). The transfer and cushion amounts are 8 cc and 4 cc, respectively. Fill time is 1.2 seconds. The fill is held at 75.8 MPa for 12 seconds. Cooling time is 25 seconds, and cycle time is 44 seconds. Test specimens are conditioned at 23° C. and 50% relative humidity for 24 hours prior to testing. Testing is performed at 23° C. using a Zwick Z010 mechanical tester available from Zwick Roell Group.

CM is the tensile modulus for compression molded samples as determined in accordance with ASTM D638. Test specimens are made at 390° C. with a ten minute preheat, a 2 minute cure, and ten minutes of cooling.

Fillers and Additives

The compositions of this invention can further comprise one or more fillers and/or additives. These materials are added in known amounts using conventional equipment and techniques. Representative fillers include talc, calcium carbonate, organo-clay, glass fibers, marble dust, cement dust, feldspar, silica or glass, fumed silica, silicates, alumina, various phosphorus compounds, ammonium bromide, antimony trioxide, antimony trioxide, zinc oxide, zinc borate, barium sulfate, silicones, aluminum silicate, calcium silicate, titanium oxides, glass microspheres, chalk, mica, clays, wollastonite, ammonium octamolybdate, intumescent compounds, expandable graphite, and mixtures of two or more of these materials. The fillers may carry or contain various surface coatings or treatments, such as silanes, fatty acids, and the like. Still other fillers include flame retardants such as the halogenated organic compounds.

The rubber-modified polymer can also contain additives such as, for example, antioxidants (e.g., hindered phenols such as, for example, IRGANOX™1076 available from Ciba Specialty Chemicals), mold release agents, processing aids (such as oils, organic acids such as stearic acid, metal salts of organic acids), colorants or pigments to the extent that they do not interfere with desired loadings and/or physical or mechanical properties of the compositions of the present invention.

Articles of Manufacture

The rubber-modified polymers of this invention are used in refrigerator and other liners and food and other packaging application in the same manner as known rubber-modified polymers. In addition to these manufactures, the rubber-modified polymers of this invention can be used in the manufacture of such articles as, but not limited to, gaskets, apparel, footwear, hoses and tubing, components for consumer electronics and appliances, and the like: These rubber-modified polymers are used in the same manner as know rubber-modified monovinylidene aromatic polymers with and without various fillers and additives, e.g., extrusion, molding, thermoforming, etc.

The following examples illustrate various embodiments of this invention. All parts and percentages are by weight unless otherwise indicated.

Specific Embodiments

Materials, Equipment and Protocol

Twenty-six examples are reported, nine of which are inventive and seventeen of which are comparative. All compositions are high impact polystyrene (HIPS) comprising polystyrene (90.5 to 88.7 wt %), rubber (6.5 to 7.3 wt %) and a poly-α-olefin oil (SPECTRASYN 10, 40 or 100 available from ExxonMobil). Other than the small differences in the amounts of components, the final products differ from one another primarily in the degree to which the rubber component is crosslinked. The rubber used in all examples was polybutadiene (Rubber #1 with a Mw of 429 kg/mol and a Mn of 220 kg/mol, and Rubber #2 with a Mw of 435 kg/mol and a Mn of 201 kg/mol). Rubber #1 is used in all examples and comparative examples except for Example 10 and Comparative Examples 18 and 19.

Styrene, ethylbenzene, rubber, oil, initiator and chain transfer agent are fed to the first of three pilot plant reactors operated in series. The feed rate is 14.7 kg/h and the product rate is 11 kg/h. The first reactor is operated at a temperature of 110-135° C. and a pressure of 0.69-1.38 MPa. The residence time of the reactants in the first reactor is 90 minutes. The contents of the first reactor are transferred the second reactor which is operated at 130-145° C. and a pressure of 0.69-1.38 MPa. The residence time of the reactants in the second reactor is also 90 minutes. The contents of the second reactor are transferred the third reactor which is operated at 140-170° C. and a pressure of 0.69-1.38 MPa. The residence time of the reactants in the third reactor is also 90 minutes.

The contents of the third reactor are transferred to devolatilization (two pilot plant units operated in series) in which solvent and unreacted monomer is removed. The units are operated at a pressure of 6.2 and 0.03 to 0.1 MPa, respectively, and the residence time (time for product to pass through both units) is about 60 minutes. Final product is recovered, sized and stored.

Product Characterization

The product of each example was analyzed for weight average molecular weight (Mw), number average molecular weight (Mn), melt flow rate (MFR), average rubber particle size, OCLI, Vicat softening point, Izod notched impact, average injection molded tensile modulus (IM), and average compression molded tensile modulus (CM). The tensile modulus ratio (IM/CM), a calculated value, is also reported.

Molecular weight (both Mw and Mn) is calculated by gel permeation chromatography (GPC) using narrow molecular weight polystyrene standards, tetrahydrofuran as a solvent, and standard integrating software. Any one of a UV detector (254 nm), diode array detector (variable wavelength but typically 254 nm) and refractive index (RI) detector can be used. Molecular weight is reported in kilograms per mole (kg/mol).

Melt flow rate (MFR) is measured using the procedure of ASTM D1238. Temperature and load for HIPS is 200° C./5 kg for 10 minutes. Measurement is made using a Zwick 4106-200 plastometer. Samples are dried at 80° C. for two hours before testing.

Average or mean rubber particle size is measured using an electrosensing technique and Coulter Multisizer II or IIe, or similar equipment. Set-ups can vary, and one acceptable set-up is using ACCUCOMP™ software, version 2.01. Three granules of polymer sample (30-70 milligrams) are dissolved in 5 mL of DMF using sonication for 15-20 minutes. Ten milliliters of electrolyte solution (1% $NH_4SCN$ in DMF) is mixed with 0.2 mL of the sample solution. The appropriate Coulter tube (20 or 30 micron aperture) is used in combination with a calibration material. The coincidence level indicator of the apparatus should read 5-10 percent. If the reading is above 10 percent, then the sample is diluted with additional electrolyte solution. If the sample is below 5 percent, more polymer solution in DMF is added. The volumetric mean particle size is reported in micron (μm).

Vicat softening point is measured according to ASTM D1525 (10 N, 120° C./h) and reported in degrees Centigrade (° C.). Notched Izod impact is measured according to ASTM D256 and reported in Joules per meter (J/m). OCLI, IM and CM are measured as described above.

Figure 1:
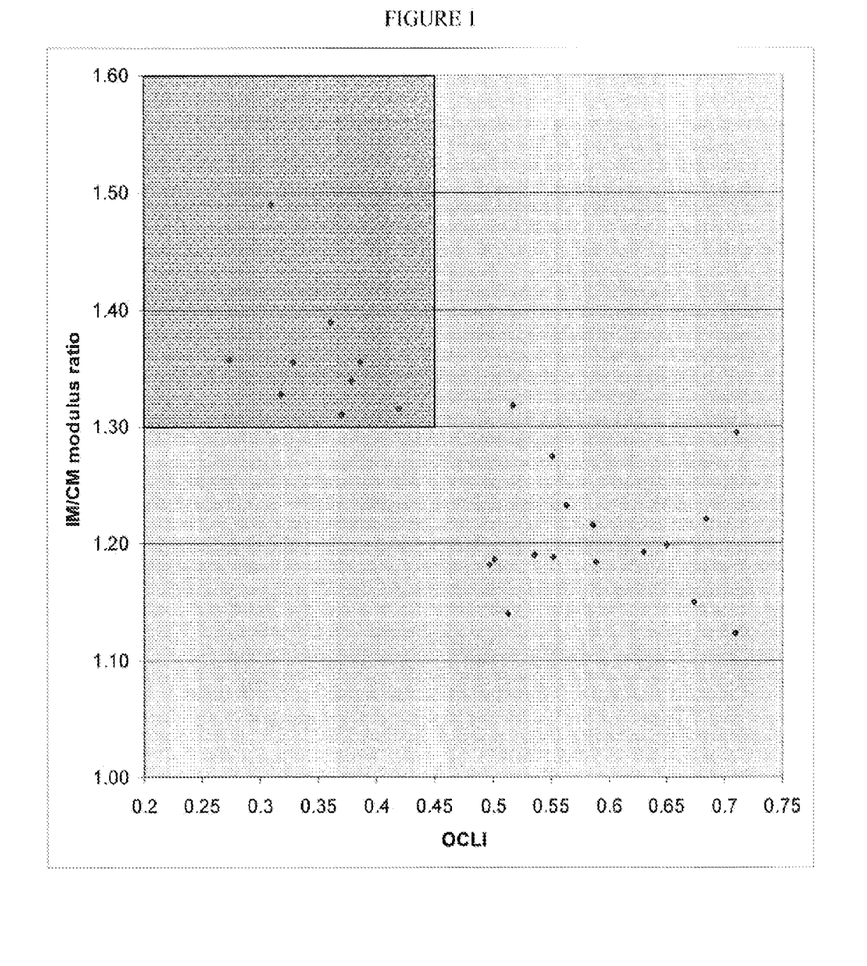
FIG. 1 is a graph plotting the tensile modulus ratio of the reported examples against their optical crosslinking index (OCLI).
Figure 2:
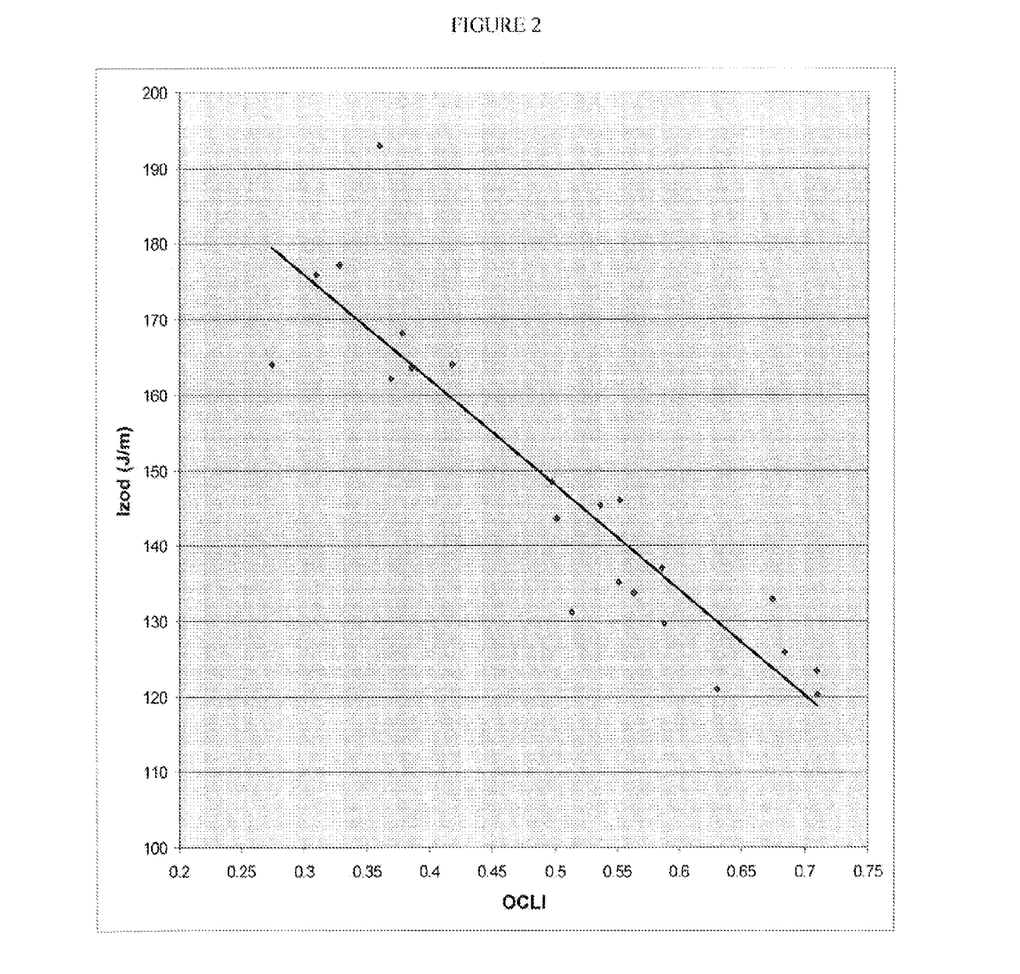
FIG. 2 is a graph plotting the notched Izod values of the reported examples against their OCLI.
Figure 3:
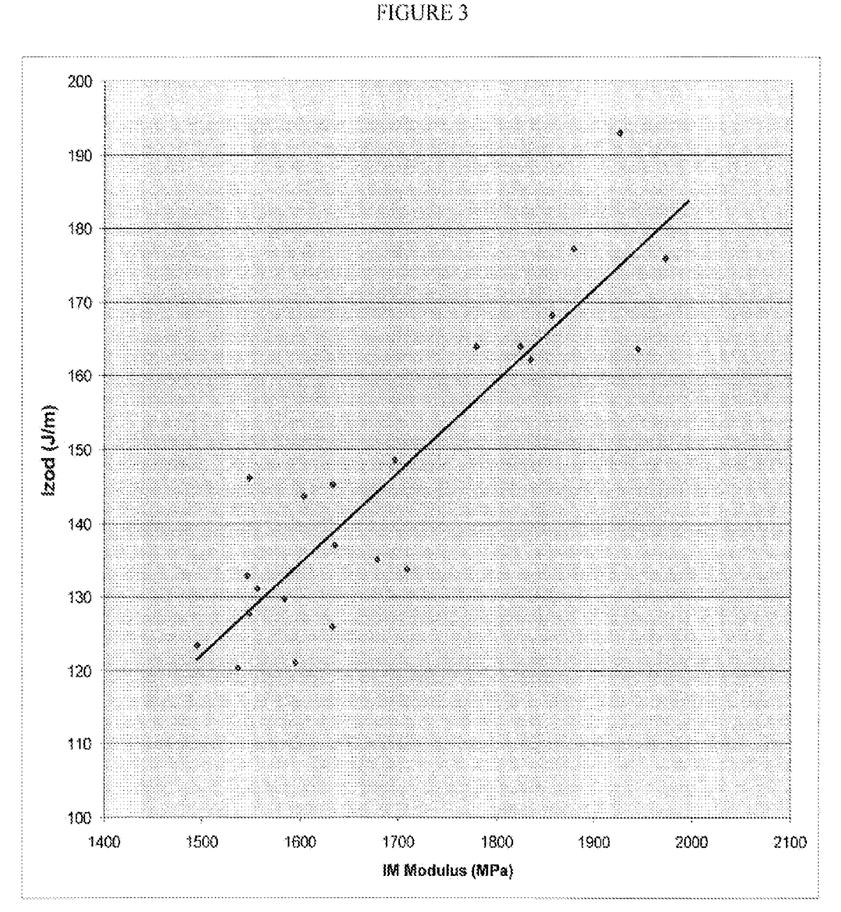
FIG. 3 is a graph plotting the notched Izod value of the reported examples against their IM tensile modulus.

The results are summarized in the Table and FIGS. 1-3. As is readily evident from a review of the inventive and comparative examples, only the inventive examples with their low crosslinking of the rubber (as shown by an OCLI of less than 0.5) have a tensile modulus ratio of greater than 1.30. This means that not only do the inventive samples have greater ductility than the comparative samples, but they also have comparable if not better tensile properties than the comparative samples notwithstanding that all samples share the same rubber content. This data is illustrated graphically in FIG. 1.

Discussion of the Results

The examples and comparative examples report the effect on rubber crosslinking with changes to various parameters of the process, particularly the operation temperature of the devo units and the type and amount of oil. In Example 1 the oil (3.4 wt % of the feed) was a 50:50 by weight blend of SPECTRASYN 40 (S40) and SPECTRASYN 10 (S10) and the devo operating temperature was relatively low, e.g., 170° C. in the first unit and 239° C. in the second unit. The recovered HIPS have an OCLI of 0.36 and an IM/CM of 1.39. Comparative Example 1 is a repeat of Example 1 except that the operating temperatures of the devo units are 200° C. and 255° C., respectively, and the OCLI and IM/CM of the HIPS are 0.55 and 1.19, respectively, thus showing that an increase in finishing temperature results in more crosslinking.

Comparative Example 2 is the same as Comparative Example 1 except the amount of the oil blend is reduced to 2.8 wt %. The OCLI and IC/CM of the HIPS product are 0.67 and 1.15, respectively showing that a reduction in oil does not have a countervailing effect on the high devo unit temperatures. Comparative Example 3 is a repeat of C2 except that the devo temperatures are reduced to 170° C. and 249° C., respectively producing a HIPS product with an OCLI of 0.50 and an IM/CM of 1.18. This change clearly affects the degree of crosslinking, but has little effect on the modulus ratio.

Example 2 is a repeat of C3 except that that the devo temperatures are reduced again, this time to 170° C. and 239° C., respectively producing a HIPS product with an OCLI of 0.31 and an IM/CM of 1.49. This change clearly produces a product with a very desirable the degree of minimal crosslinking and modulus ratio (similar to Example 1 but with less oil). Example 3 is a repeat of Example 2 except that the amount of oil is again reduced (this time to 2.2 wt %) and again, the HIPS product has a very desirable OCLI of 0.39 and IM/CM of 1.36. Here too, the finishing temperature has more influence on the OCLI and IM/CM of the final product than does the amount of oil in the product.

C4 and C5 are repeats of Example 3 except that the temperature of the devo units are raised to 170° C. and 249° C. in C4 and 200° C. and 255° C. in C5. The OCLI and TM/CM of both HIPS products deteriorate to 0.55 and 1.27 for the C4 product, and 0.68 and 1.22 for the C5 product, again showing the importance of the finishing temperature to rubber crosslinking. C6 is a repeat of C5 except that the oil blend is 30:70 by weight of S40:S10 and the amount of oil is increased to 2.8 wt %. The high devo unit temperatures again dominate the degree of crosslinking producing a HIPS product with an IM/CM of 1.16. C7 is a repeat of C6 except that the devo unit temperatures are lowered to 170° C. and 249° C. which improves the OCLI to 0.54 and the IM/CM to 1.19.

Example 4 is a repeat of C7 except that the devo temperatures are again lowered, this time to 170° C. and 239° C. which produces a HIPS product with an OCLI of 0.33 and an IM/CM of 1.35. Example 5 is a repeat of Example 4 except that the oil is only S10. The HIPS product has an OCLI of 0.27 and an IM/CM of 1.36. C8 and C9 are repeats of Example 5 except that the temperature of the devo units are raised to 170° C. and 249° C. in C8 and 200° C. and 255° C. in C9. The OCLI and IM/CM of both HIPS products deteriorate to 0.59 and 1.18 for the C8 product, and 0.71 and 1.29 for the C9 product. These results are consistent with the results reported for Example 3 and C4 and C5.

C10 is a repeat of C9 except that the oil is a 10:90 weight blend of S40/S10, and the HIPS product has an OCLI of 0.56 and an IM/CM of 1.20 showing that the composition of the oil has little, if any, effect on the crosslinking of the rubber if the finishing temperature is high. C11 reinforces this showing as a repeat of C10 except that the finishing temperature is lowered (170° C. for the first unit and 249° C. for the second unit) and producing a HIPS product with better OCLI and IM/CM, i.e., 0.59 and 1.22, respectively.

Examples 6 and 7 are repeats of C11 except the devo unit temperatures in both are 170° C. and 239° C. and each produce minimal crosslinked rubber with OCLI of 0.37 and 0.42, respectively, and IM/CM of 1.31 and 1.32, respectively. The oil in Example 7 was a 10:90 weight blend of S100 and S10. C12 and C13 are a repeat of Example 7 except that that the temperature of the devo units are raised to 170° C. and 249° C. in C12 and 200° C. and 255° C. in C13. The OCLI and IM/CM of both HIPS products deteriorate to 0.56 and 1.23 for the C12 product, and 0.63 and 1.19 for the C13 product.

C14 is a repeat of C13 except that the oil is a 50:50 weight blend of S40/S10, and 4.9 wt % rubber is used rather than 5.4 wt %. The HIPS product had an OCLI of 0.65 and an IM/CM of 1.20. C15 is a repeat of C14 except that the finishing temperature was reduced (170° C. in the first devo unit and 249° C. in the second devo unit). This produced an improvement in the OCLI and IM/CM to 0.52 and 1.32, respectively.

Example 8 is a repeat of C15 except that the devo temperatures are again lowered, this time to 170° C. and 239° C. which produces a HIPS product with an OCLI of 0.32 and an IM/CM of 1.33. Example 9 is a repeat of Example 8 except that Rubber #2 is substituted for Rubber #1. The HIPS product has an OCLI of 0.38 and an IM/CM of 1.34. C16 and C17 are repeats of Example 9 except that the temperature of the devo units are raised to 170° C. and 249° C. in C16 and 200° C. and 255° C. in C17 The OCLI and IM/CM of both HIPS products deteriorate to 0.50 and 1.19 for the C16 product, and 0.51 and 1.14 for the C17 product. These results are consistent with the results reported for Example 3 and C4 and C5, Example 5 and C8 and C9, and Example 7 and C12 and C13.

Notched Izod

Moreover, the inventive samples display a greater notched Izod property than do the samples of the comparative examples. This data is illustrated graphically in FIGS. 2 and 3. In FIG. 2, the nine data points on or about the upper left segment of the line which is in the upper left quadrant of the graph are inventive examples. In FIG. 3, the nine data points on or about the upper right segment of the line which is in the upper right quadrant of the graph are inventive examples which clearly illustrate the desired effect of higher ductility in combination with higher stiffness.

TABLE

Properties and Calculated Values of HIPS Inventive and Comparative Samples

| Property | Example No. | | | | | | | |
|---|---|---|---|---|---|---|---|---|
| | 1 | C1 | C2 | C3 | 2 | 3 | C4 | C5 |
| MFR (g/10 min) | 2.58 | 2.47 | 2.03 | 2.32 | 2.35 | 2.11 | 2.17 | 2.15 |
| Mw (kg/mol) | 223.6 | 217.3 | 250.4 | 219.7 | 221.9 | 224.1 | 220.5 | 221.2 |
| Mn (kg/mol) | 87.6 | 86.9 | 97.4 | 92.0 | 86.7 | 87.0 | 91.8 | 88.7 |

TABLE-continued

Properties and Calculated Values of HIPS Inventive and Comparative Samples

| Property | | | | | | | | |
|---|---|---|---|---|---|---|---|---|
| Mean Rubber Particle Size (μm) | 3.8 | 4.0 | 4.4 | 4.3 | 4.1 | 4.3 | 4.5 | 4.4 |
| Vicat (° C.) | 101.9 | 101.8 | 102.6 | 102.2 | 102.9 | 102.6 | 102.8 | 102.3 |
| Izod (J/m) | 193 | 146 | 133 | 148 | 176 | 164 | 135 | 126 |
| IM (MPa) | 1925 | 1548 | 1546 | 1695 | 1972 | 1944 | 1678 | 1633 |
| CM (MPa) | 1386 | 1303 | 1345 | 1434 | 1324 | 1434 | 1317 | 1338 |
| IM/CM | 1.39 | 1.19 | 1.15 | 1.18 | 1.49 | 1.36 | 1.27 | 1.22 |
| OCLI | 0.36 | 0.55 | 0.67 | 0.50 | 0.31 | 0.39 | 0.55 | 0.68 |

| Property | C6 | C7 | 4 | 5 | C8 | C9 |
|---|---|---|---|---|---|---|
| MFR (g/10 min) | 2.19 | 2.45 | 2.49 | 3.11 | 2.7 | 2.61 |
| Mw (kg/mol) | 219.3 | 218.3 | 222.6 | 219.4 | 218.2 | 218.6 |
| Mn (kg/mol) | 93.1 | 90.8 | 87.0 | 85.7 | 94.6 | 92.1 |
| Mean Rubber Particle Size (μm) | 4.5 | 4.4 | 4.4 | 4.6 | 4.4 | 4.7 |
| Vicat (° C.) | 101.1 | 101.3 | 101.8 | 100 | 99.3 | 99.8 |
| Izod (J/m) | 128 | 145 | 177 | 164 | 130 | 120 |
| IM (MPa) | 1548 | 1633 | 1878 | 1778 | 1583 | 1536 |
| CM (MPa) | 1338 | 1372 | 1386 | 1310 | 1338 | 1186 |
| IM/CM | 1.16 | 1.19 | 1.35 | 1.36 | 1.18 | 1.29 |
| OCLI | NA | 0.54 | 0.33 | 0.27 | 0.59 | 0.71 |

| Property | C10 | C11 | 6 | 7 | C12 |
|---|---|---|---|---|---|
| MFR (g/10 min) | 2.50 | 2.61 | 2.78 | 2.75 | 2.88 |
| Mw (kg/mol) | 218.4 | 218.6 | 217.7 | 218.7 | NA |
| Mn (kg/mol) | 92.1 | 93.2 | 70.5 | 83.1 | NA |
| Mean Rubber Particle Size (μm) | 3.5 | 4.7 | 4.6 | 4.6 | 4.6 |
| Vicat (° C.) | 99.7 | 100.2 | 100.3 | 100.3 | 99.9 |
| Izod (J/m) | 123 | 137 | 162 | 164 | 134 |
| IM (MPa) | 1494 | 1635 | 1834 | 1823 | 1708 |
| CM (MPa) | 1331 | 1345 | 1400 | 1386 | 1386 |
| IM/CM | 1.12 | 1.22 | 1.31 | 1.32 | 1.23 |
| OCLI | 0.71 | 0.59 | 0.37 | 0.42 | 0.56 |

| | Example No. | | | | | | |
|---|---|---|---|---|---|---|---|
| Property | C13 | C14 | C15 | 8 | 9 | C16 | C17 |
| MFR (g/10 min) | 2.53 | 2.36 | 2.39 | 2.46 | 2.32 | 2.25 | 2.23 |
| Mw (kg/mol) | NA | 215.8 | 221.4 | 218.5 | 218.0 | 214.5 | 215.0 |
| Mn (kg/mol) | NA | 89.5 | 112.8 | 88.5 | 86.3 | 94.3 | 90.2 |
| Mean Rubber Particle Size (μm) | 4.7 | 5.9 | 5.8 | 5.7 | 4.3 | NA | 4.6 |
| Vicat (° C.) | 100.1 | 101.3 | 101.8 | 101.9 | 101.9 | 101.8 | 101.8 |
| Izod (J/m) | 121 | NA | NA | NA | 168 | 144 | 131 |
| IM (MPa) | 1595 | 1661 | 1836 | 1996 | 1856 | 1603 | 1556 |

TABLE-continued

Properties and Calculated Values of
HIPS Inventive and Comparative Samples

| CM (MPa) | 1338 | 1386 | 1393 | 1503 | 1386 | 1352 | 1366 |
|---|---|---|---|---|---|---|---|
| IM/CM | 1.19 | 1.20 | 1.32 | 1.33 | 1.34 | 1.19 | 1.14 |
| OCLI | 0.63 | 0.65 | 0.52 | 0.32 | 0.38 | 0.50 | 0.51 |

NA—Not available.

Although the invention has been described with certain detail through the preceding specific embodiments, this detail is for the primary purpose of illustration. Many variations and modifications can be made by one skilled in the art without departing from the spirit and scope of the invention as described in the following claims.

What is claimed is:

1. A mass-polymerized, rubber-modified monovinylidene aromatic polymer in which the rubber is crosslinked such that the modified polymer has an optical crosslink index (OCLI) of <0.5 and an injection molded/compression molded (IM/CM) modulus ratio of ≥1.3, wherein the polymer is HIPS.

2. The polymer of claim 1 in which the OCLI is <0.45.

3. The polymer of claim 1 in which the OCLI is <0.4.

4. The polymer of claim 2 in which the IM/CM modulus ratio is ≥1.32.

5. The polymer of claim 3 in which the IM/CM modulus ratio is ≥1.35.

6. An article comprising the polymer of claim 1.

7. A process of modifying the ductility/stiffness balance of a rubber-modified monovinylidene, mass-polymerized aromatic polymer, the process comprising the step of crosslinking the rubber such that the rubber-modified polymer has an OCLI of <0.5 and an IM/CM modulus ratio of ≥1.3, wherein the polymer is HIPS.

8. The process of claim 7 in which the rubber of the rubber-modified monovinylidene aromatic polymer is crosslinked during a finishing step of a process in which the rubber-modified monovinylidene aromatic polymer is made.

9. The process of claim 8 in which the rubber is crosslinked by controlling at least one of the finishing step temperature or residence time of the rubber-modified monovinylidene aromatic polymer in the finishing step.

10. The process of claim 8 in which the rubber is crosslinked either by controlling the structure of the rubber or by diluting the polymer with one or more oils that exhibit a preference for the rubber phase of the polymer.

11. The process of claim 7 in which the finishing step comprises passing the rubber-modified monovinylidene aromatic polymer through a devolatization unit operated at a temperature between 235° C. and 245° C.

12. The process of claim 7 in which the rubber-modified monovinylidene aromatic polymer comprises a poly-a-olefin oil.

13. A mass-polymerized, rubber-modified monovinylidene aromatic polymer in which the rubber is crosslinked such that the modified polymer has an optical crosslink index (OCLI) of <0.5 and an injection molded/compression molded (IM/CM) modulus ratio of ≥1.3, wherein the polymer is HIPS, wherein the rubber-modified monovinylidene aromatic polymer further comprises poly-a-olefin oil.

14. The polymer of claim 13 in which the OCLI is <0.45.

15. The polymer of claim 13 in which the OCLI is <0.4.

16. The polymer of claim 14 in which the IM/CM modulus ratio is ≥1.32.

17. The polymer of claim 15 in which the IM/CM modulus ratio is ≥1.35.

18. An article comprising the polymer of claim 13.

19. The process of claim 12 in which the rubber of the rubber-modified monovinylidene aromatic polymer is crosslinked during a finishing step of a process in which the rubber-modified monovinylidene aromatic polymer is made.

20. The process of claim 19 in which the rubber is crosslinked by controlling at least one of the finishing step temperature or residence time of the rubber-modified monovinylidene aromatic polymer in the finishing step.

21. The process of claim 19 in which the rubber is crosslinked either by controlling the structure of the rubber or by diluting the polymer with one or more oils that exhibit a preference for the rubber phase of the polymer.

* * * * *

UNITED STATES PATENT AND TRADEMARK OFFICE
CERTIFICATE OF CORRECTION

PATENT NO. : 9,447,219 B2
APPLICATION NO. : 13/500135
DATED : September 20, 2016
INVENTOR(S) : Gilbert C. E. Bouquet et al.

It is certified that error appears in the above-identified patent and that said Letters Patent is hereby corrected as shown below:

In the Claims

Column 14, Claim 12, Line 18, after "comprises a" replace "poly-a-olefin" with --poly-α-olefin--.

Column 14, Claim 13, Lines 26-27, after "further comprises" replace "poly-a-olefin" with --poly-α-olefin--.

Signed and Sealed this
Twenty-ninth Day of May, 2018

Andrei Iancu
*Director of the United States Patent and Trademark Office*